Feb. 18, 1947. H. A. MINER 2,415,960
FRICTION SHOCK ABSORBER
Filed March 1, 1944
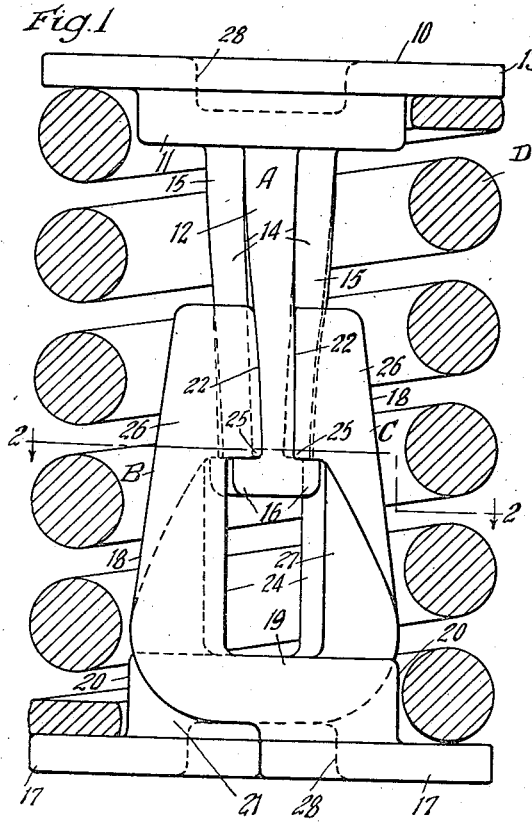
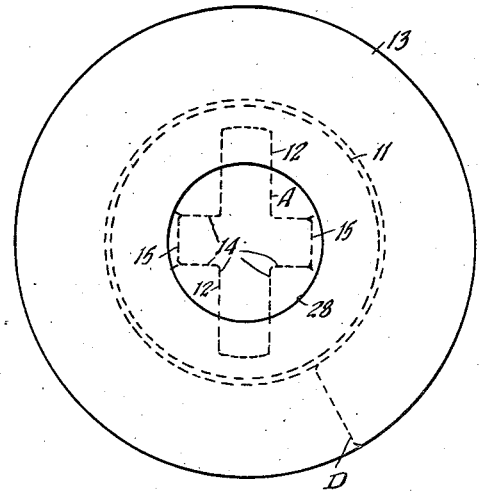
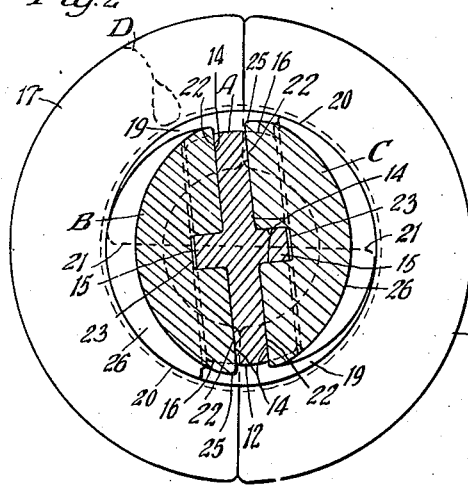
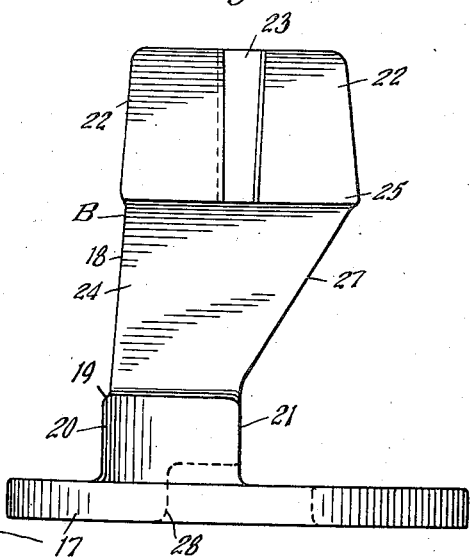
Inventor
Henry A. Miner
By Henry Fuchs
Atty.

Patented Feb. 18, 1947

2,415,960

UNITED STATES PATENT OFFICE 2,415,960

FRICTION SHOCK ABSORBER

Henry A. Miner, Evanston, Ill., assignor to W. H. Miner, Inc., Chicago, Ill., a corporation of Delaware Application March 1, 1944, Serial No. 524,509

8 Claims. (Cl. 267—9)

This invention relates to improvements in friction shock absorbers, especially adapted for use in connection with truck springs of railway cars for snubbing or dampening the action of the springs.

One object of the invention is to provide a friction shock absorbing mechanism comprising a friction post, tiltable friction shoes embracing the post on opposite sides and having sliding frictional engagement therewith, and a spring yieldingly opposing relative sliding movement of the shoes and post, and yieldingly rocking the shoes against the post to place the parts in frictional contact, wherein the post and shoes have threaded engagement with each other, to effect twisting or slight relative rotation of the post and shoes with respect to each other to augment the frictional resistance.

A further object of the invention is to provide a mechanism as set forth in the preceding paragraph, wherein the post is tapered to spread the shoes apart and rock the same against the resistance of the spring during compression of the mechanism, to produce progressively increasing resistance.

Other objects of the invention will more clearly appear from the description and claims hereinafter following.

In the drawing forming a part of this specification, Figure 1 is a side elevational view of my improved shock absorber, showing the spring resistance in vertical section. Figure 2 is a horizontal sectional view, corresponding substantially to the line 2—2 of Figure 1. Figure 3 is a top plan view of Figure 1. Figure 4 is an elevational view of the left hand shoe in Figure 1, looking from right to left in said figure.

As shown in the drawing, my improved friction shock absorber comprises a friction post A, two tiltable friction shoes B and C, and a spring resistance D.

The friction post A comprises a disc-like follower member 10 having a depending central cylindrical boss 11 and a relatively wide plate member 12 depending from said boss. The platelike member 12 is preferably tapered toward its lower end. Around the boss 11, the disclike follower presents an annular flange 13 which forms an abutment for the spring D. The plate member 12 presents longitudinally extending friction surfaces 14—14 on opposite sides thereof. Longitudinally extending central ribs 15—15 are provided on opposite sides of the post projecting from the friction surfaces 14—14 thereof. The plate member is slightly twisted from end to end, thereby presenting, in effect, a screw member of relatively high pitch. At the lower end, the plate member 12 is provided with horizontally disposed, laterally projecting stop flanges 16—16 projecting from the friction surface sides thereof, adapted to cooperate with shoulders on the shoes B and C to limit relative lengthwise separation of the post and shoes.

The two friction shoes B and C are of identical design, each shoe comprising a substantially semi-circular, flat, platelike follower 17, an upstanding arm 18, and a horizontal section 19, connecting the arm 18 to the follower 17. The horizontal section 19 extends laterally from the inner side of the arm 18 toward the arm 18 of the other shoe, and is upwardly offset with respect to the follower 17, which is at the outer end portion of the section 19. Each shoe is thus broadly of L-shaped form, the arm 18 forming the vertical section of the L and the follower 17 and horizontal arm together forming the horizontal section thereof. The arms 18—18 of the shoes B and C are disposed at opposite sides of the post A, the arm of the shoe B being at the left hand side of the post, as seen in Figure 1, and the arm of the shoe C at the right hand side thereof. As further clearly shown in Figure 1, the horizontal section 19 of the shoe B extends to the right from the arm 18 thereof, and the follower 17 of said shoe is disposed at the right hand side of the mechanism, and the horizontal section 19 of the shoe C extends to the left from the arm 18 thereof, and the follower 17 of the shoe C is disposed at the left hand side of the mechanism. The two follower members 17—17 of the shoes B and C are in abutment along their diametrical inner edges and together form a sectional lower follower disc in vertical alignment with the follower disc 10 of the post A. The vertical outer edge wall of the horizontal section 19 of each shoe is rounded, as indicated at 20, said rounded wall being concentric to the outer edge of the semi-circular follower 17, but inwardly offset therefrom. The inner edge of the horizontal section 19, which is indicated by 21, is substantially straight and at right angles to the diametrical inner edge of the semi-circular follower 17. The sections 19—19 of the two shoes B and C are in abutment with each other at the center of the mechanism along the edges 21—21.

On the inner side, the arm 18 of each shoe presents a longitudinally extending friction surface 22 opposed to the cooperating friction surface 14 of the post and having a corresponding twist. The inner side of the arm also has a lengthwise extending groove 23 therein, having a twist corresponding to the rib 15 of said post, and slidingly receiving said rib in the manner of a thread. The two pivoted shoes B and C together act as a split nut having thread portions cooperating with the twisted threadlike portions of the post A. Below the friction surfaces 22, the inner sides of each shoe B and C are cut out, as indicated at 24, thereby providing horizontal shoulders 25—25 adapted to be engaged by the flanges 16—16 of the post A to limit lengthwise separation of the post and shoe. The outer sides of the shoes are inclined upwardly and inwardly and the surfaces of the same are transversely curved, said outer sides thus presenting conical surfaces 26—26. To accommodate the horizontal sections 19—19 of the shoes B and C and also facilitate assembling of the parts of the mechanism, the arms or plates 18—18 are undercut, as indicated at 27.

The follower 10 of the post A and the followers 17—17 of the shoes B and C are preferably provided with central openings or seats 28—28 adapted to respectively accommodate the usual spring centering projections of the top and bottom spring follower plates of the spring cluster of the railway truck, the seat 28 of the followers 17—17 of the shoes B and C being formed partly in each follower.

The spring D is in the form of a heavy coil, surrounding the post A and the shoes B and C and bears at its top and bottom ends on the flange 13 of the follower 10 of the post A and the followers 17—17 of the shoes B and C. The spring D is preferably under initial compression and holds the shoes against the friction surfaces of the post A due to the pressure exerted on the followers 17—17 of said shoes.

In assembling the parts of my improved shock absorber, the shoes B and C are first placed side by side with the diametrical inner edges of the semi-circular followers 17—17 in abutment with each other. With the shoes resting on a suitable support, the spring D is placed around the same and supported on the followers 17—17. The post A is then applied by inserting the same downwardly within the coil of the spring D and entering the lower end of the post between the shoes, the upper ends of which are temporarily held spread apart to admit the enlarged head portion formed by the flanges 16—16. The post is forced downwardly until the stop flanges 16—16 pass the shoulders 25—25 and snap underneath the same.

The improved shock absorber or snubber is substituted for one or more of the spring units of a truck spring cluster, being interposed between the top and bottom spring plates of said cluster.

As will be evident to those skilled in this art, my improved shock absorber may be applied either in the position shown in Figure 1 or the mechanism as a whole may be inverted, that is, with the post at the bottom and the shoes at the top.

The operation of the improved shock absorber is as follows: Upon the cluster of springs of the railway car truck being compressed between the spring follower plates of the truck springs, the friction post A and the friction shoes B and C are moved toward each other in lengthwise direction against the resistance of the spring D. Due to the taper of the post, the cooperating ends of the shoes are spread apart and the shoes tilted on the inner edges of the semi-circular followers 17—17, against the resistance of the spring D, which bears on said base plates. At the same time, due to the nut and screw formation of the shoes and post, slight relative rotation or twisting of the shoes and post is produced. High frictional resistance is thus provided between the friction surfaces of the post and shoes, and the contacting faces of the ribs 15—15 of the post and grooves 23—23 of the shoes, as well as between the followers of the shoes and post and the spring follower plates of the spring cluster on which the post and shoes bear, thereby snubbing the action of the truck springs. Compression of the mechanism is positively limited by engagement between the upper ends of the shoes and the boss 11 of the disclike follower 10 of the post. Upon the spring follower plates being moved apart, during recoil of the truck springs, the expansive action of the spring D restores all of the parts to the normal release position shown in Figure 1, separation of the post and shoes in lengthwise direction being limited by engagement of the stop flanges 16—16 of the post with the shoulders 25—25 of the shoes.

I claim:

1. In a friction shock absorber, the combination with a friction post comprising an end follower and a platelike friction member extending from said follower, said platelike member being twisted from end to end; of friction shoes embracing the post at opposite sides, each shoe comprising a friction plate section and a follower section extending laterally from the outer end of said plate section, said plate section having a lengthwise extending friction surface twisted from end to end to correspond with the twist of said post and having sliding engagement with the corresponding side of the post; and a spring surrounding said post and shoes and bearing at opposite ends on the follower of the post and the follower sections of said shoes.

2. In a friction shock absorber, the combination with a friction post comprising a platelike section and a follower at the outer end of said section, said platelike section having friction surfaces on opposite sides thereof and being twisted from end to end to provide a screw member; of a pair of tiltable friction shoes embracing said post at opposite sides on said friction surfaces and slidable lengthwise of said post, said shoes having friction surfaces on the inner sides thereof engaging with and correspondingly twisted to the friction surfaces of the post; laterally outwardly extending follower plate sections at the outer ends of said shoes fulcrumed on their inner edges; and a coil spring surrounding said post and shoes and bearing at opposite ends on the follower section of the post and the follower plate sections of the shoes to resist relative lengthwise inward movement of the shoes with respect to the post and outward tilting of the shoes away from the post.

3. In a friction shock absorber, the combination with a friction post comprising an end follower and a platelike friction member extending from said follower, said platelike member being twisted from end to end; of longitudinally extending helical ribs on said post at two opposite sides thereof; friction shoes embracing said post at said opposite sides, each shoe comprising a friction plate section and a follower section extending laterally from the outer end of said plate section, said plate section having a lengthwise extending friction surface twisted from end to end to correspond with the twist of said post, and a lengthwise extending helical groove, said surface having sliding engagement with the corresponding side of the post and said groove slidably accommodating the corresponding rib of the post; and a spring surrounding said post and shoes and bearing at opposite ends on the follower of the post and the follower sections of said shoes.

4. In a friction shock absorber, the combination with a friction post comprising a platelike section and a follower at the outer end of said section, said platelike section having friction surfaces on opposite sides thereof and being twisted from end to end to provide a screw member; of a longitudinally extending, helical rib projecting from each friction surface of the post; of a pair of tiltable friction shoes embracing said post at opposite sides on said friction surfaces and slidable lengthwise of said post, said shoes having friction surfaces on the inner sides thereof engaging with and correspondingly twisted to the friction surfaces of the post, the friction surface of each shoe having a longitudinally extending, helical groove therein receiving the rib at the corresponding side of the post; laterally outwardly extending follower plate sections at the outer ends of said shoes fulcrumed on their inner edges; and a coil spring surrounding said post and shoes and bearing at opposite ends on the follower section of the post and the follower plate sections of the shoes to resist relative lengthwise inward movement of the shoes with respect to the post and outward tilting of the shoes away from the post.

5. In a friction shock absorber, the combination with a tapered friction post; of tiltable friction shoes embracing said post at opposite sides, said post and shoes having screw threaded engagement with each other to produce relative rotation thereof during relative movement of the shoes and post toward each other; and spring means reacting between the post and shoes to oppose relative movement of the shoes and post toward each other in direction lengthwise of the mechanism and resist tilting movement of said shoes away from said post.

6. In a friction shock absorber, the combination with a tapered friction post comprising an end follower and a platelike friction member extending from said follower, said platelike member being twisted from end to end; of friction shoes embracing the post at opposite sides, each shoe comprising a friction plate section and a follower section extending laterally from the outer end of said plate section, said plate section having a lengthwise extending friction surface twisted from end to end to correspond with the twist of said post and having sliding engagement with the corresponding side of the post; and a spring surrounding said post and shoes and bearing at opposite ends on the follower of the post and the follower sections of said shoes.

7. In a friction shock absorber, the combination with a friction post comprising an end follower and a tapered platelike friction member extending from said follower, said platelike member being twisted from end to end; of longitudinally extending, helical ribs on said post at two opposite sides thereof; friction shoes embracing said post at said opposite sides, each shoe comprising a friction plate section and a follower section extending laterally from the outer end of said plate section, said plate section having a lengthwise extending friction surface twisted from end to end to correspond with the twist of said post, the friction surface of each shoe having a lengthwise extending, helical groove therein, said surface having sliding engagement with the corresponding side of the post and said groove slidably accommodating the corresponding rib of the post; and a spring surrounding said post and shoes and bearing at opposite ends on the follower of the post and the follower sections of said shoes.

8. In a friction shock absorber, the combination with a friction post comprising a tapered platelike section and a follower at the outer end of said section, said platelike section having friction surfaces on opposite sides thereof and being twisted from end to end to provide a screw member; of a longitudinally extending, helical rib projecting from each friction surface of the post; of a pair of tiltable friction shoes embracing said post at opposite sides on said friction surfaces and slidable lengthwise of said post, said shoes having friction surfaces on the inner sides thereof engaging with and correspondingly twisted to the friction surfaces of the post, the friction surface of each shoe having a longitudinally extending, helical groove therein receiving the rib at the corresponding side of the post; laterally outwardly extending follower plate sections at the outer ends of said shoes fulcrumed on their inner edges; and a coil spring surrounding said post and shoes and bearing at opposite ends on the follower section of the post and the follower plate sections of the shoes to resist relative lengthwise movement of the shoes inwardly of the post and outward tilting of the shoes away from the post.

HENRY A. MINER.

REFERENCES CITED

The following references are of record in the file of this patent:

UNITED STATES PATENTS

| Number | Name | Date |
|---|---|---|
| 1,221,428 | Edahl | Apr. 3, 1917 |
| 1,853,932 | Schmidt | Apr. 12, 1932 |
| 1,442,893 | Lewis | Jan. 23, 1923 |
| 1,644,391 | Mitchell | Oct. 4, 1927 |
| 1,654,763 | Tauscher | Jan. 3, 1928 |
| 2,380,028 | Dath | July 10, 1945 |